(12) United States Patent
Mastromatteo (10) Patent No.: US 6,395,074 B1
(45) Date of Patent: May 28, 2002

(54) DESICCANT BAG WITH INTEGRATED FILTER AND METHOD OF MAKING SAME

(75) Inventor: Matthew Mastromatteo, Centerville, OH (US)

(73) Assignee: Stanhope Products Company, Brookville, OH (US)

( * ) Notice: Subject to any disclaimer, the term of this patent is extended or adjusted under 35 U.S.C. 154(b) by 0 days.

(21) Appl. No.: 09/858,773

(22) Filed: May 16, 2001

Related U.S. Application Data (60) Provisional application No. 60/204,453, filed on May 16, 2000.

(51) Int. Cl.[7] ............................ F25B 43/00; B01D 53/04
(52) U.S. Cl. .................... 96/135; 96/147; 55/DIG. 5; 210/289; 210/DIG. 6; 62/503
(58) Field of Search ................................ 210/282, 287, 210/288, 289, 484, DIG. 6; 62/503, 474, 476; 96/147, 153, 135; 55/515, 381, DIG. 5

(56) References Cited

U.S. PATENT DOCUMENTS

| | | | | |
|---|---|---|---|---|
| 2,649,923 A | * | 8/1953 | Woppman ................... 206/204 |
| 3,710,948 A | * | 1/1973 | Sexton et al. ............... 210/484 |
| 3,879,292 A | | 4/1975 | McClive ..................... 210/282 |
| 3,990,872 A | * | 11/1976 | Cullen ......................... 55/515 |
| 4,116,649 A | | 9/1978 | Cullen et al. |
| 4,291,548 A | | 9/1981 | Livesay ........................ 62/503 |
| 4,401,447 A | | 8/1983 | Huber |
| 4,405,347 A | | 9/1983 | Cullen et al. |
| 4,436,623 A | | 3/1984 | Cullen et al. ................ 210/282 |
| 4,457,843 A | | 7/1984 | Cullen et al. ................ 210/282 |
| 4,464,261 A | | 8/1984 | Cullen et al. ................ 210/282 |
| 4,474,035 A | | 10/1984 | Amin et al. ................... 62/503 |
| 4,496,378 A | | 1/1985 | Kish ............................ 55/316 |
| 4,619,673 A | | 10/1986 | Cullen et al. |
| 4,911,739 A | | 3/1990 | Cullen et al. |
| 4,994,185 A | | 2/1991 | Cullen et al. ................ 210/282 |
| 5,177,982 A | | 1/1993 | Plemens ....................... 62/503 |
| 5,458,773 A | * | 10/1995 | Holland ....................... 210/282 |
| 5,636,525 A | | 6/1997 | Riemenschneider ......... 62/474 |
| 5,865,998 A | | 2/1999 | Abraham et al. ............ 210/282 |
| 6,083,305 A | | 7/2000 | LeConey et al. ............. 96/147 |
| 6,155,072 A | * | 12/2000 | Sullivan et al. ............... 96/147 |

* cited by examiner

Primary Examiner—David A. Simmons
Assistant Examiner—Frank M. Lawrence
(74) Attorney, Agent, or Firm—Biebel & French (57) ABSTRACT

The present invention relates generally to desiccant bags and filters for use in receiver/dryers or accumulator canisters of automotive air conditioning systems. More specifically, the present invention relates to a dual or single desiccant bag provided with a filter section such that the desiccant bag effectively combines two separate components, a desiccant bag and a filter, into a single article. Accordingly, the bag is adapted to contain adsorbent material therein to adsorb moisture, or undesirable substances, within the a/c systems of automobiles, trucks or other motor vehicles while the filter is adapted to keep particles, dirt, or dust from entering the orifice in the bight of a U-bend tube where oil pickup is provided for lubrication of the a/c system.

35 Claims, 10 Drawing Sheets

DESICCANT BAG WITH INTEGRATED FILTER AND METHOD OF MAKING SAME

CROSS REFERENCE TO RELATED APPLICATION

The benefit of prior U.S. Provisional Application No. 60/204,453 filed May 16, 2000 is hereby claimed.

FIELD OF THE INVENTION

This invention relates generally to desiccant bags and filters for use in receiver/dryers or accumulator canisters of automotive air conditioning systems. More specifically, it relates to a desiccant bag provided with a filter section, and method of making same, such that the desiccant bag effectively combines two separate components, a desiccant bag and a filter, into a single article.

BACKGROUND OF THE INVENTION

Accumulators and receiver dryers in automotive air conditioning systems utilize desiccant to adsorb moisture, or undesirable substances, which can enter the system through fittings, hoses, connections, and the like. One common method of containing desiccant within the system is in a bag made of porous fabric which is retained in a fixed position within an accumulator or receiver/dryer canister. These canisters also commonly contain a U-bend tube, or pipe, with an orifice in the outside bend at the bottom of the canister to provide oil pickup for lubrication of the system. This orifice typically is covered with a filter device, made of plastic, steel, or aluminum, to assure that particles, dirt, or dust is not circulated into the a/c system.

Accordingly, the present invention integrates a desiccant bag and a filter into a single article such that bag is provided with a filter section. This bag and filter combination is positioned at the bottom of the U-bend tube so that the filter section covers the orifice in the outside bend.

One significant advantage of the invention is cost reduction insofar as the need for a separate filter assembly and a separate operation to attach the assembly to the tube is eliminated. Also, the bag can be fitted tightly around the tube thereby eliminating the possibility of any large particles entering the orifice in the U-bend tube.

Accordingly, the invention provides a simple way for combining a desiccant bag and a filter while at the same time reducing the material and assembly costs associated with separate components. Also, the desiccant bag keeps large particles from entering the orifice in the U-bend tube.

SUMMARY OF THE INVENTION

The present invention includes a desiccant bag made from a sheet of porous fabric. The bag comprises a filter section having a yoke, or wall portion, disposed about a central axis to define a sleeve. The bag further includes first and second longitudinal end portions having opposing top and bottom layers comprising a length and a width and having opposing sides connecting the layers. The layers further have opposing first and second ends. The second ends of the layers of the first end portion and the second ends of the layers of the second end portion are connected to form sealed ends while the first ends opposingly and integrally join the end portions with the wall portion so that the first ends run parallel with the central axis and the end portions extend outwardly therefrom.

Additionally, the bag comprises a seam extending across the bag for sealing lengthwise and has first and second seals. The first seal seals together the first ends of the layers of the first end portion across the width thereof adjacent the wall portion and the second seal seals together the first ends of the layers of the second end portion across the width thereof adjacent the wall portion so that the end portions define first and second compartments wherein the first seal and sealed end of the first end portion define opposing ends of a first compartment, and the second seal and sealed end of the second end portion define opposing ends of a second compartment. The first and second compartments are provided with a plurality of desiccant particles contained therein.

Construction of the bag involves providing a sheet of porous fabric having opposing longitudinal and lateral side edges and connecting the opposing longitudinal side edges, such as by ultrasonic, heat fusion and/or stitching procedures, to form a tube-like structure comprising a width and having opposing top and bottom layers, opposing sides for connecting the layers, and opposing first and second ends having openings. Next, spaced first and second seals are placed intermediate the ends of the tube-like structure. The seals seal across the width of the tube-like structure connecting the top layer with the bottom layer so that the ends define a compartment provided with an opening.

The opposing longitudinal edges of the tube between the first and second seals then are sliced lengthwise using a cutting tool or die to form the filter section having a wall portion, or yoke, disposed about a central axis and having first and second openings to define a sleeve. Lastly, the compartments are filled with desiccant and the openings sealed shut so that the ends form sealed ends for containing particles within the compartments.

Accordingly, the filter section receives the end of a U tube through its sleeve and the bag is easily slid thereon until the filter section is situated over an orifice in the bight of a U-bend tube. The bag fits around the U tube so that the filter section can act as a filtering device at the orifice while gravity firmly holds the bag in the canister thereby acting as a method to hold the bag in place. The yoke can be adjusted to fit tightly over the U-bend tube once assembled.

In an alternate embodiment, the desiccant bag comprises only one compartment for containing desiccant particles therein. In this embodiment, a first seal is placed between the ends of the tube-like structure substantially adjacent one opening. A second seal seals this opening. Both seals seal across the width of the tube-like structure and connect the top layer with the bottom layer. The single end portion defines a compartment having an opening. The opposing longitudinal sides of the tube-like structure between the seals are sliced lengthwise using a cutting tool or die to form the filter section. Lastly, the compartment is filled with desiccant and sealed shut so that the end forms a sealed end for containing desiccant particles within the compartment.

Notably, one can integrate different filter material into the wall portion of the bag thereby allowing for different filter characteristics as required by the manufacturer of the accumulator or receiver/dryer canister. As such, if the porous bag material is thought to be too dense to allow for proper lubricant pickup, then a more course filter material may be used in the wall portion at the location where the bag will position over the orifice.

Yet, a further embodiment of the invention involves providing an aperture in the filter section between the first and second openings of the sleeve so that the aperture can be positioned around a separate filter which may already be assembled on the tube. As such, the bag will still be located in place but will not act as a filter.

Therefore, it may be appreciated that an object of the present invention is to provide a single or dual desiccant bag having a filter integrated therein for reducing the material and assembly costs associated with separate components.

It is a further object of present invention to provide both a dual and single compartment desiccant bag having an aperture adapted for receiving a filter on a U-bend tube.

Lastly, it is another object of the invention to provide a desiccant bag with filter integrated therein that fits snugly around the bight in a U-bend tube and keeps large particles from entering the orifice.

Other objects and advantages of the invention will be apparent from the following description and the accompanying drawings.

DETAILED DESCRIPTION OF THE INVENTION

Figure 1:
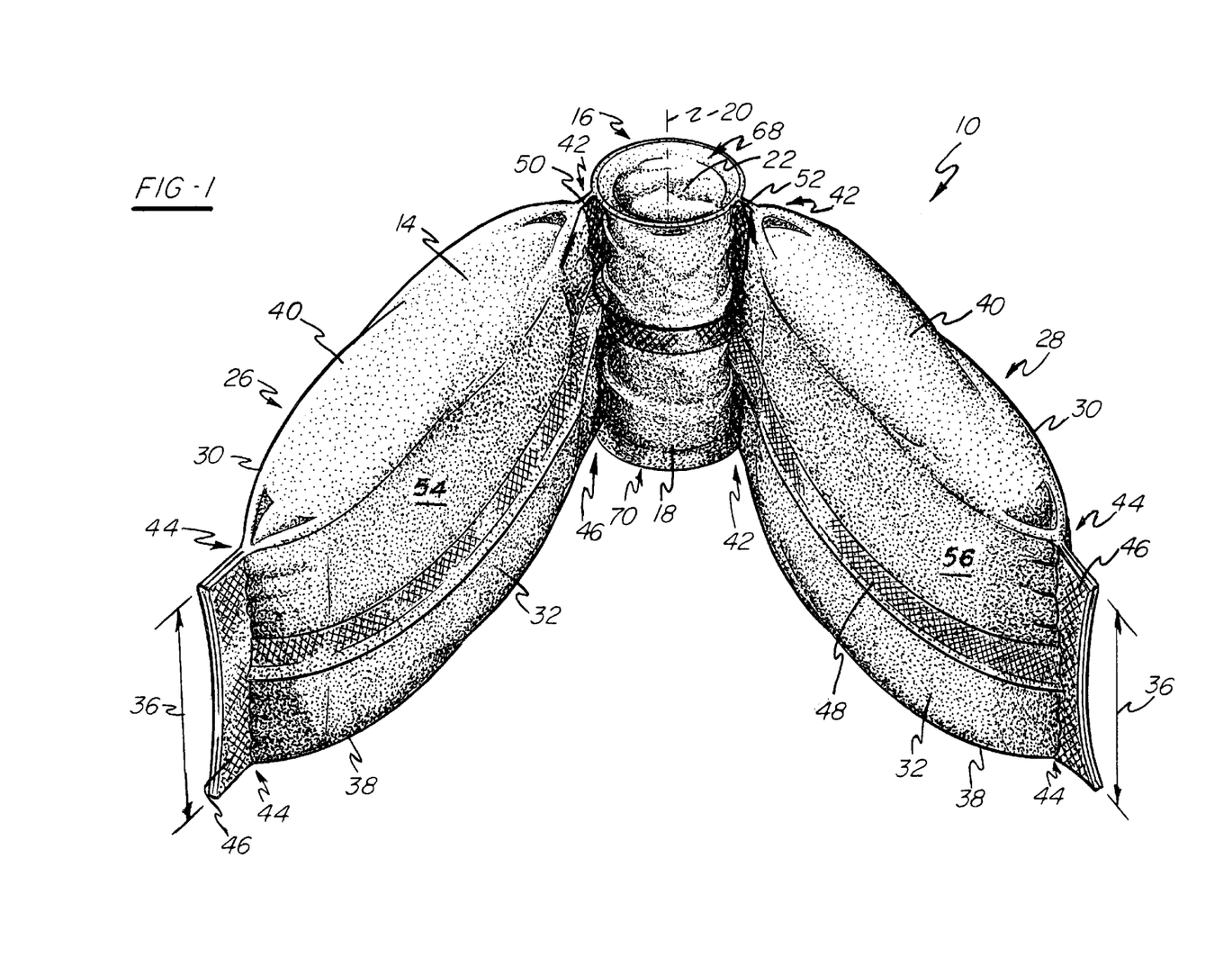
FIG. 1 is a perspective view of a dual desiccant bag with integrated filter in accordance with the invention.

Turning to attached FIG. 1, there is shown a dual desiccant bag 10 of the present invention containing desiccant particles 12 (FIG. 7) therein for use in conjunction with refrigeration and/or drying systems (not shown) that are commonly supplied in automobiles, trucks or other motor vehicles (not shown).

The desiccant bag 10 is made from porous fabric 14, preferably non-woven fabric such as needle punched polyester felts, spun bonded felts, such as spun bonded polyester, spun bonded nylon and spun bonded polyolefin, and other non-woven materials such as flash spun, spunlaced, and meltdown polyester or nylons. The bag further includes a filter section 16 comprising a wall portion 18, or yoke, disposed about a central axis 20 and having first and second openings 68 and 70 to define a sleeve 22 so that the bag will snugly fit over the U-bend tube 24 (FIG. 2) of an accumulator and/or receiver/dryer structure (not shown) of an automotive refrigeration system and the like (not shown).

FIG. 1 further shows the bag 10 comprising first and second longitudinal end portions 26 and 28 having opposing top and bottom layers 30 and 32 comprising a width 36 and having opposing sides 38 and 40 connecting the layers 30, 32. The layers 30, 32 further have opposing first and second ends 42 and 44. The second ends 44 of the layers 30, 32 of the first end portion 26 and the second ends 44 of the layers 30, 32 of the second end portion 28 are connected to form sealed ends 46 while the first ends 42 opposingly and integrally join the end portions 26, 28 with the wall portion 18 so that the first ends 42 run parallel with the central axis 20 and the end portions 26, 28 extend outwardly therefrom. The sealed ends 46 may be made via ultrasonic sealing means, heat fusion, stitching or the like.

The bag 10 further comprises a seam 48 extending longitudinally across the bag 10 for sealing the bag 10 lengthwise and has first and second seals 50 and 52. The seam 48 may be made via ultrasonic, heat fusion and/or stitching procedures. The first seal 50 seals together the first ends 42 of the layers 30, 32 of the first end portion 26 across the width 36 thereof adjacent the wall portion 18 and the second seal 52 seals together the first ends 50 of the layers 30, 32 of the second end portion 28 across the width 36 thereof adjacent the wall portion 18 so that the end portions 26, 28 define first and second compartments 54 and 56 wherein the first seal 50 and sealed end 46 of the first end portion 26 define opposing ends of the first compartment 54, and the second seal 52 and sealed end 46 of the second end portion 28 define opposing ends of the second compartment 56. The first and second compartments 54, 56 are provided with a plurality of desiccant particles 12 (FIG. 7) contained therein.

Notably, one can integrate different porous fabric 14 into the wall portion 18 of the bag 10 thereby allowing for different filter characteristics as required by the manufacturer of the accumulator or receiver/dryer canister. For example, if the porous fabric 14 is thought to be too dense to allow for proper lubricant pickup, then a more course fabric 14 may be used in the wall portion 18 at the location where the bag 10 will position over the orifice 58 (FIG. 2).

Figure 2:
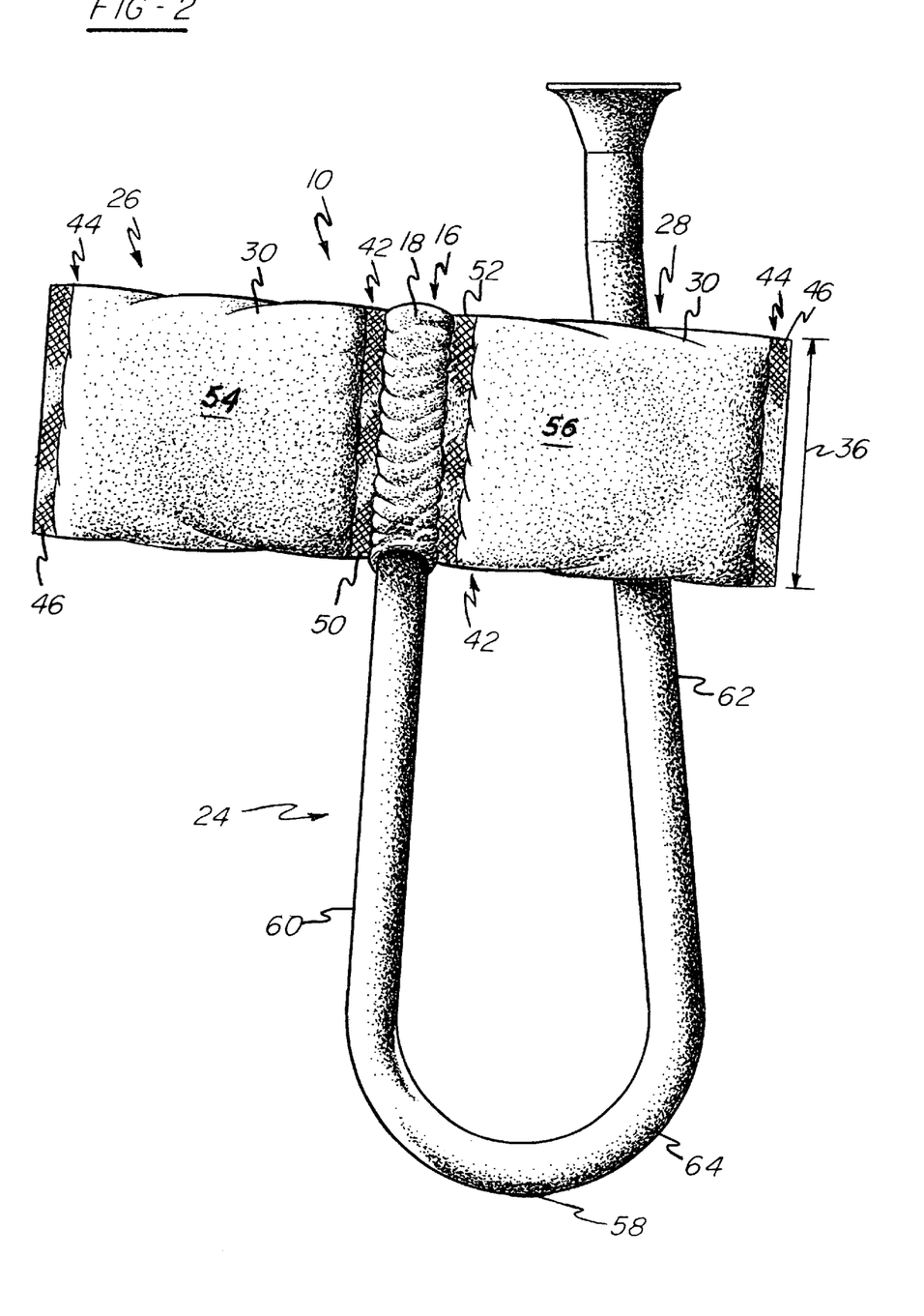
FIG. 2 is the top view of a dual desiccant bag in accordance with the invention as it is snugly and slidingly fitted over the upstanding legs of a U-bend tube.
Figure 3:
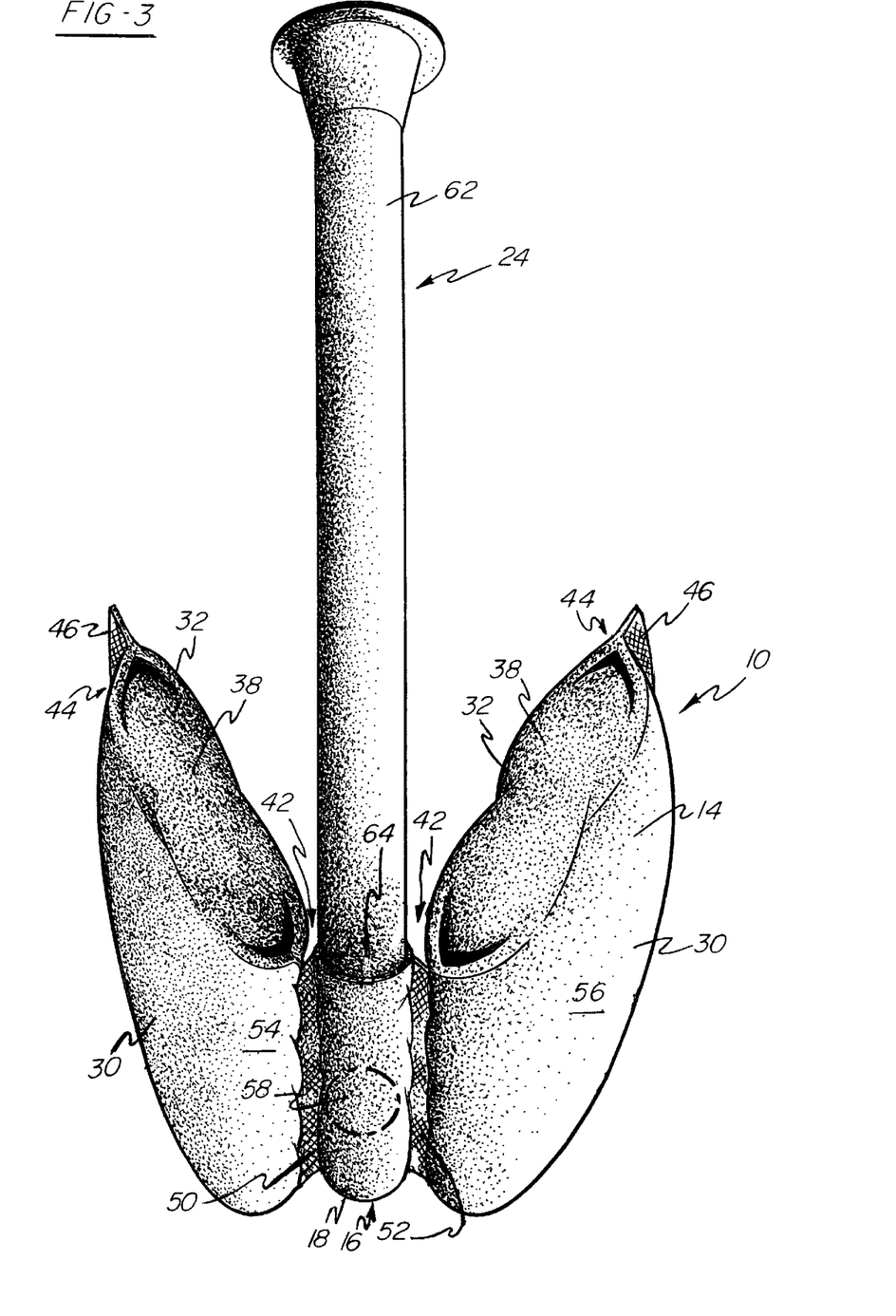
FIG. 3 is a schematic view showing positioning of the dual desiccant bag in accordance with the invention over the orifice in the U-bend tube shown in FIG. 2.

Turning to FIG. 2, there is shown a U-bend tube 24 of the type normally encountered in automotive refrigeration systems (not shown). This tube 22 comprises upstanding leg members 60 and 62 and bight portion 64 connecting the upstanding legs 60, 62. The sleeve 22 is snugly and slidably fit over upstanding leg 60 and is then positioned as shown in FIG. 3 over the orifice 58 provided in the bight portion 64 of the tube 24.

Figure 4:
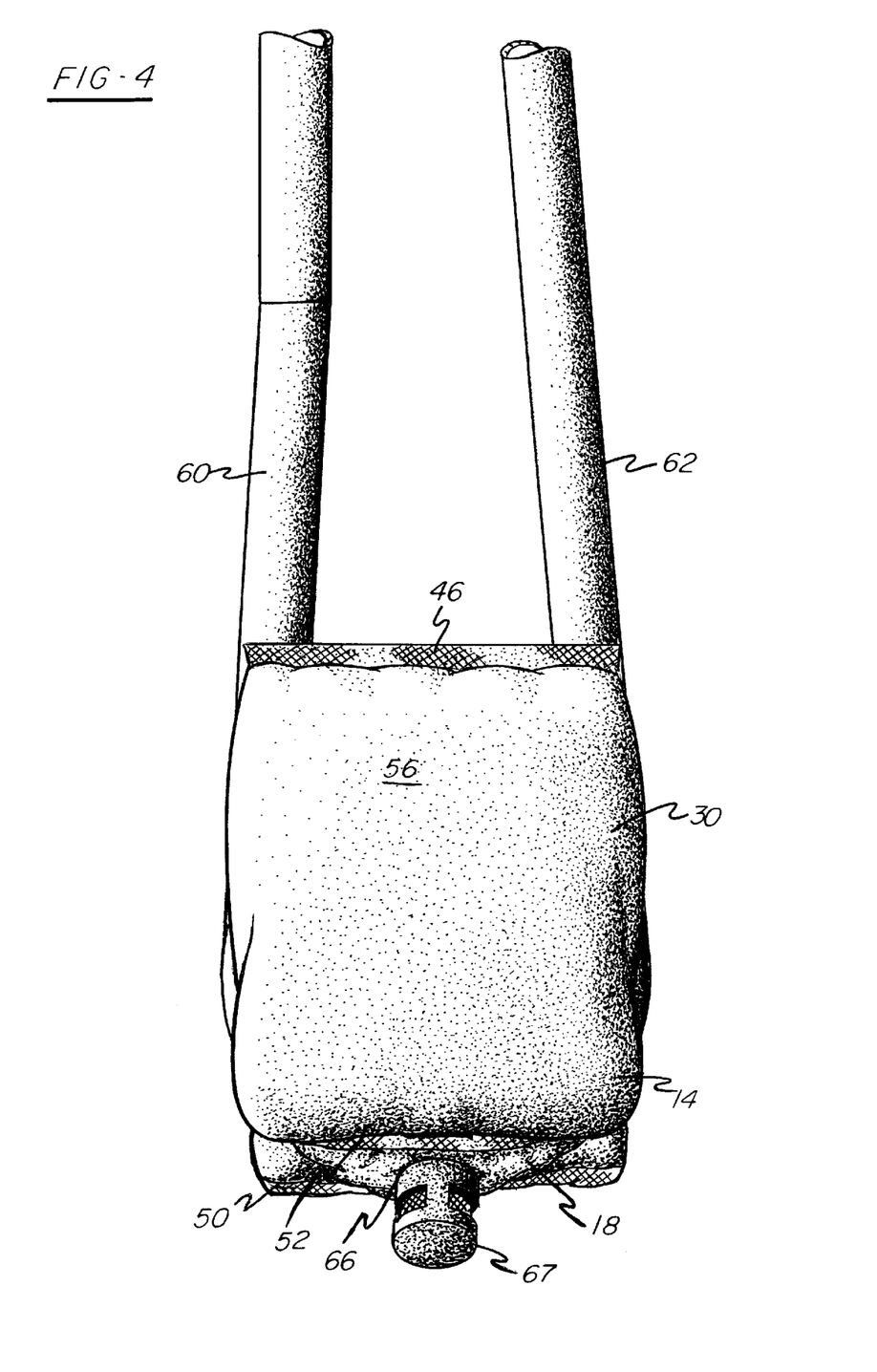
FIG. 4 is a side elevational view of another embodiment of the invention in which the dual desiccant bag is provided with an aperture therein in the filtering section so as to receive a filter from the bight portion of the U-bend tube.

FIG. 4 shows another embodiment of the bag 10 wherein the first and second compartments 54, 56 are again separated by a filter section 16. In this embodiment an aperture 66 is provided in the filter section 16 between the first and second openings 68, 70 of the wall portion 18 so that the aperture 66 can be positioned to receive a separate filter 67 or can be positioned around a separate filter 67 already assembled on the tube. As such, the bag 10 will still be located in place but will not act as a filter.

Figure 5:
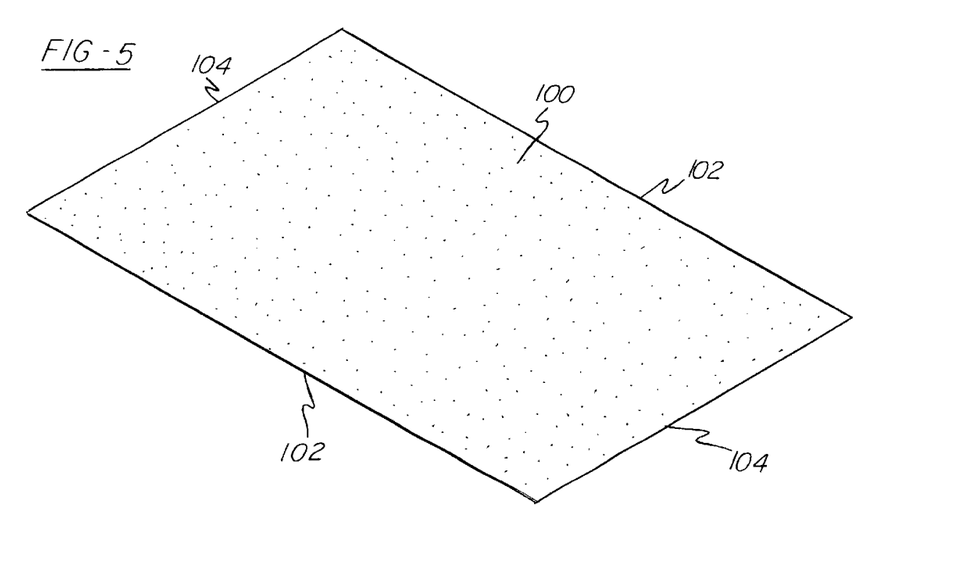
FIG. 5 is a top perspective view of a sheet of porous non-woven fabric used to manufacture the dual and single desiccant bags of the invention as shown in FIGS. 1
Figure 6:
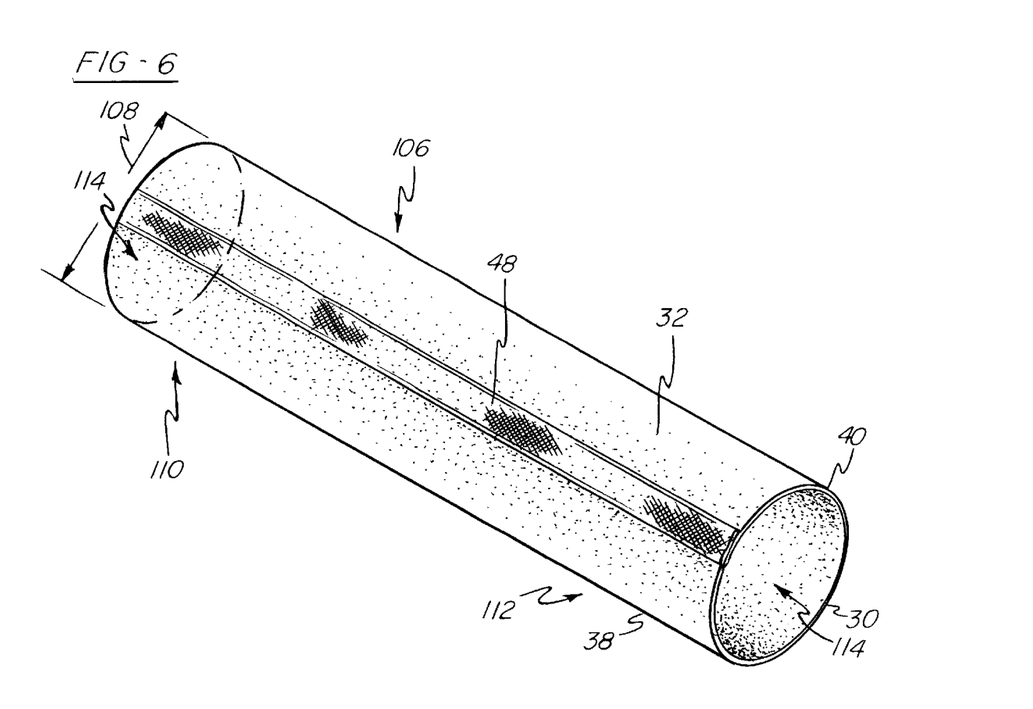
FIG. 6 is a bottom perspective view of the tube-like structure formed by connecting the longitudinal edges of the sheet from FIG. 5.

In order to manufacture the dual desiccant bag 10, a sheet of porous non-woven fabric 100 is provided having opposing longitudinal and lateral side edges 102 and 104 as shown in FIG. 5. In FIG. 6, the opposing longitudinal side edges 102 are connected, such as by ultrasonic sealing, heat fusion and/or stitching procedures, to form a tube-like structure 106 comprising a width 108 and having opposing top and bottom layers 30, 32, opposing sides 38, 40 connecting the layers 30, 32, and opposing first and second ends 110 and 112 having openings 114. The longitudinal side edges 102 are connected such that the seam 48 extends longitudinally across the tube-like structure 106.

Figure 7:
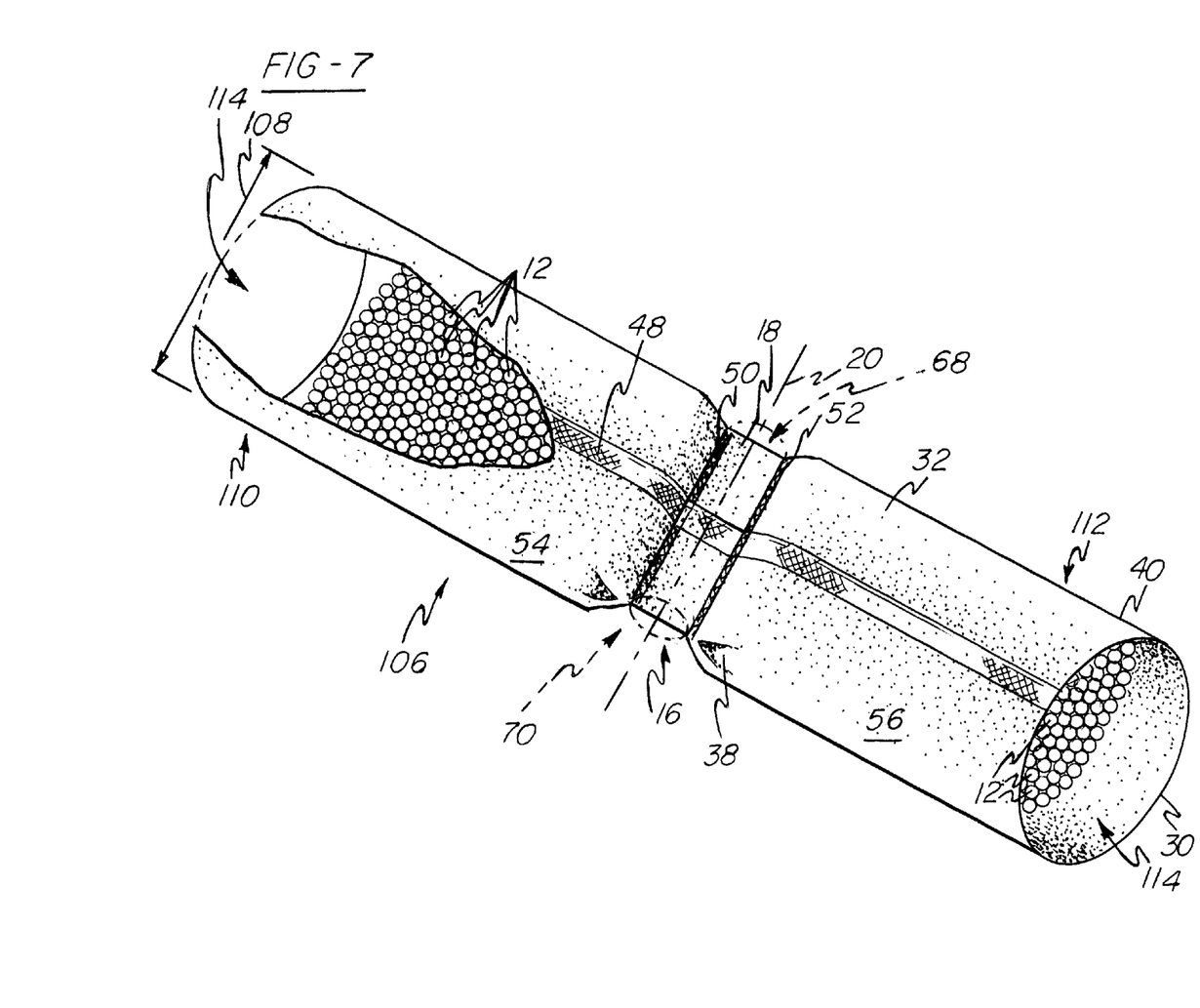
FIG. 7 is a bottom perspective view of FIG. 6 after spaced first and second seals are placed intermediate the ends of the tube-like structure and the longitudinal sides of the structure are cut between the seals.
Figure 8:
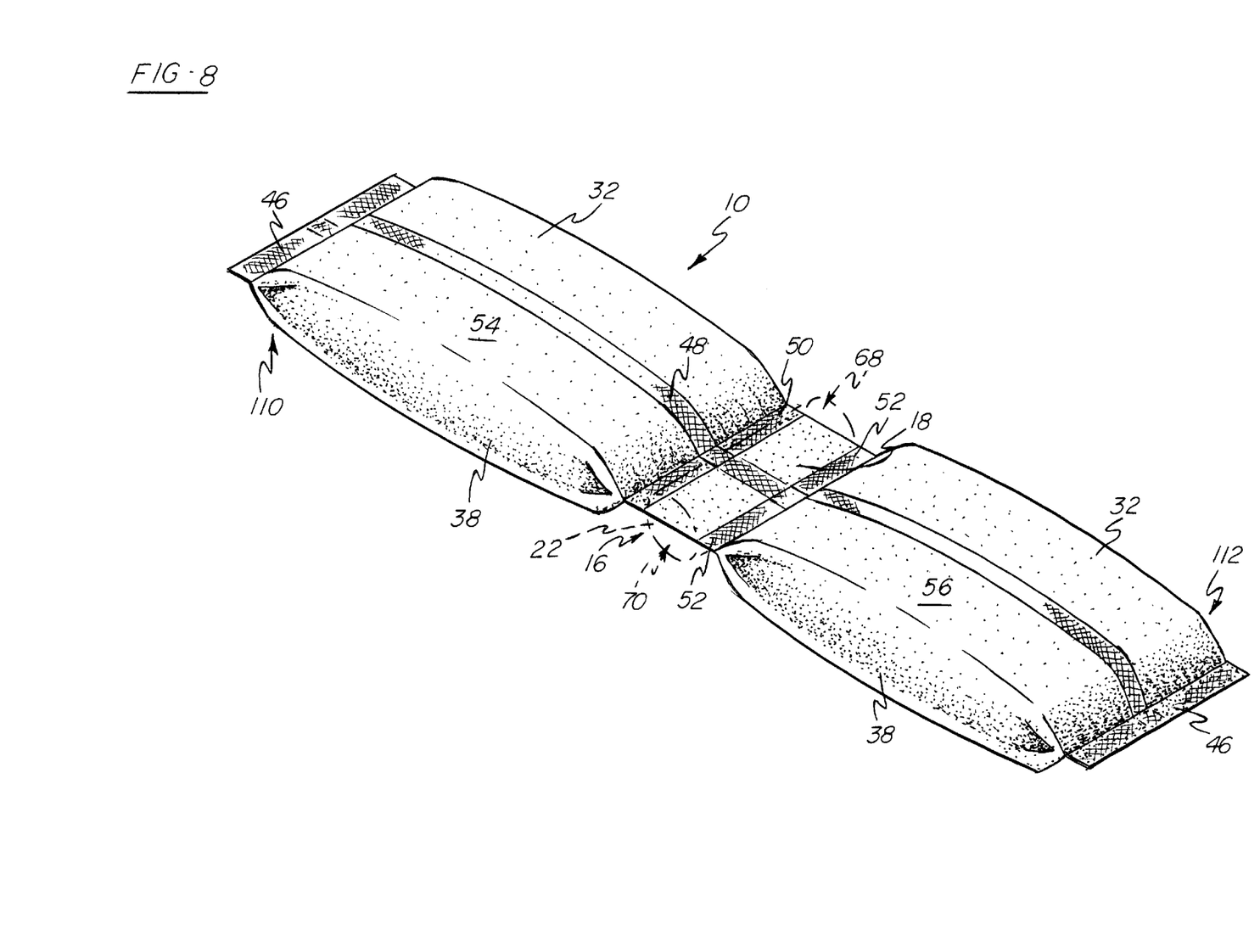
FIG. 8 is a bottom perspective view of the tube-like structure from FIG. 7 wherein the compartments have been sealed to form end seals thereby forming a dual desiccant bag of the present invention having a filter section integrated therein.

Next, spaced first and second seals 50, 52 are placed intermediate the ends 110, 112 of the tube-like structure 106 as shown in FIG. 7. The seals 50, 52 seal across the width 108 of the tubular structure 106 connecting the top layer 30 of the tube-like structure 106 with the bottom layer 32 so that the first and second ends 110, 112 define first and second compartments 54, 56 provided with openings 114. Then, as further shown in FIG. 7, the opposing sides 38, 40 between the first and second seals 50, 52 are sliced lengthwise using a cutting tool or die (not shown) to form a filter section 16 having a wall portion 18, or yoke, disposed about a central axis 20 and having first and second openings 68, 70 to define a sleeve 22. Lastly, the compartments 54, 56 are filled with desiccant 12 and sealed shut via ultrasonic, heat fusion and/or stitching procedures, as shown in FIG. 8, so that the ends 110, 112 have sealed ends 46 for containing particles 12 within the compartments 54, 56.

If necessary, and in order to provide a bag 10 as shown in FIG. 4, an aperture 66 further is provided in the filter section 16, preferably intermediate the first and second openings 68, 70 of the wall portion 18.

Accordingly, as shown in FIGS. 2 and 3, once the bag 10 is completed, the filter section 16 receives a leg 60 of the U-bend tube 24 through its sleeve 22 and the bag 10 is easily slid thereon until the filter section 16 is situated over the orifice 58. The bag 10 fits around the tube 24 so the filter section 16 can act as a filtering device at the orifice 58 while gravity firmly holds the bag 10 in the bottom of a canister (not shown) thereby acting as a method to hold the bag 10 in place. The wall portion 18 can be adjusted to fit tightly over the U-bend tube 24 once assembled.

Figure 9:
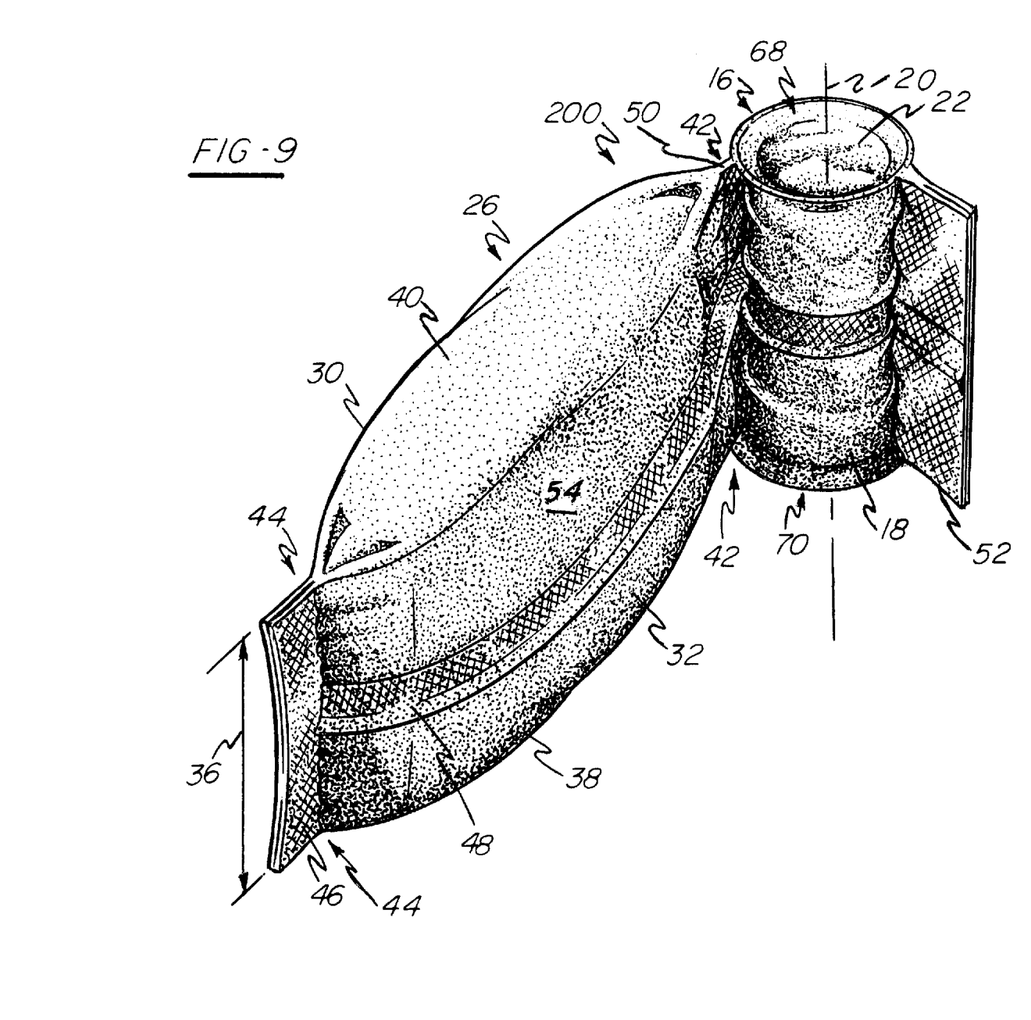
FIG. 9 is a perspective view of another embodiment showing a single desiccant bag with integrated tube filter.

Turning now to the embodiment shown in FIG. 9, a single desiccant bag 200 is shown.

In this embodiment, the desiccant bag 200 comprises only one compartment 54 for containing desiccant particles 12 (FIG. 11) therein. This bag 200, similar to the dual desiccant bag 10 (FIG. 1), has a filter section 16 comprising a wall portion 18 disposed about a central axis 20 having first and second openings 68, 70 to define a sleeve 22.

The bag 200 further includes a longitudinal end portion 26 having opposing top and bottom layers 30, 32 comprising a width 36 and having opposing sides 38, 40 connecting the layers 30, 32. The layers 30, 32 further have opposing first and second ends 42, 44. The second ends 44 are connected to form a sealed end 46 while the first end 42 is integrally joined with the wall portion 18 so that the first end 42 runs parallel with the central axis 20 and the end portion 26 extends outwardly therefrom. The sealed end 46 may be sealed via ultrasonic sealing means, heat fusion, stitching or the like.

The bag 200 also comprises a seam 48 extending longitudinally across the bag 200 for sealing the bag 200 lengthwise and has first and second seals 50, 52. The seam 48 may be made via ultrasonic, heat fusion and/or stitching procedures. The second seal 52 seals along the length of the wall portion 18 and the first seal 50 seals together the first ends 42 of the layers 30, 32 of the end portion 26 across the width 36 thereof adjacent the wall portion 18 so that the end portion 26 defines a compartment 54 wherein the first seal 50 and sealed end 46 of the end portion 26 define opposing ends of the compartment 54. Preferably, the seals 50, 52 are opposingly positioned such that the filter section 16 is situated between the first and second seals 50, 52. Additionally, the second seal 52 may extend outwardly from the wall portion 18. Lastly, the compartment 54 has a plurality of desiccant particles 12 (FIG. 11) contained therein.

The artisan will appreciate that the single desiccant bag 200 shown in FIG. 9, similar to the dual desiccant bag 10 (FIG. 1), may further be provided with an aperture 66 (FIG. 4) in the filter section 16. Also, the artisan will appreciate that one can integrate different porous fabric 14 into the wall portion 18 of the bag 200 thereby allowing for different filter characteristics.

Figure 10:
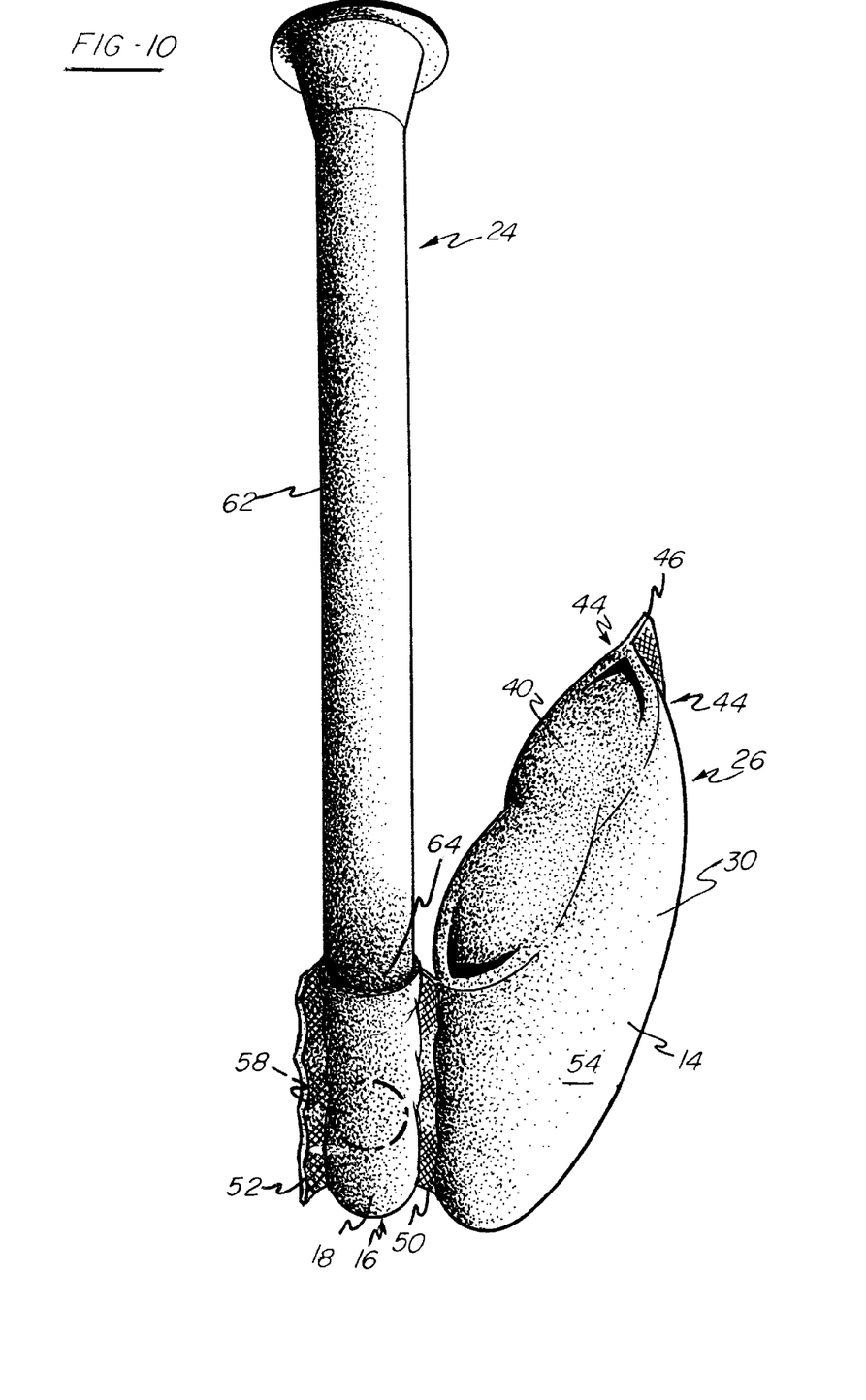
FIG. 10 is a schematic view of the embodiment shown in FIG. 5, showing the filter section positioned over the orifice.

FIG. 10 further shows the embodiment of FIG. 9 in its intended position over the bight portion 64 of the U-bend tube 24 of an accumulator or receiver/dryer (not shown). Here, the filter section 16 overlies the orifice 58 in the tube 24.

The single desiccant bag 200 is manufactured similarly to the dual desiccant bag 10 (FIG. 8) such that, as shown in FIG. 5, a sheet of porous non-woven fabric 100 is provided having opposing longitudinal and lateral side edges 102, 104. And, as further shown in FIG. 6, the opposing longitudinal side edges 102 are connected, such as by ultrasonic sealing, heat fusion and/or stitching procedures, to form a tube-like structure 106 comprising a width 108 and having opposing top and bottom layers 30, 32, opposing sides 38, 40 connecting the layers 30, 32, and opposing first and second ends 110, 112 having openings 114. The longitudinal side edges 102 are connected such that the 48 seam extends longitudinally across the tube-like structure 106.

Figure 11:
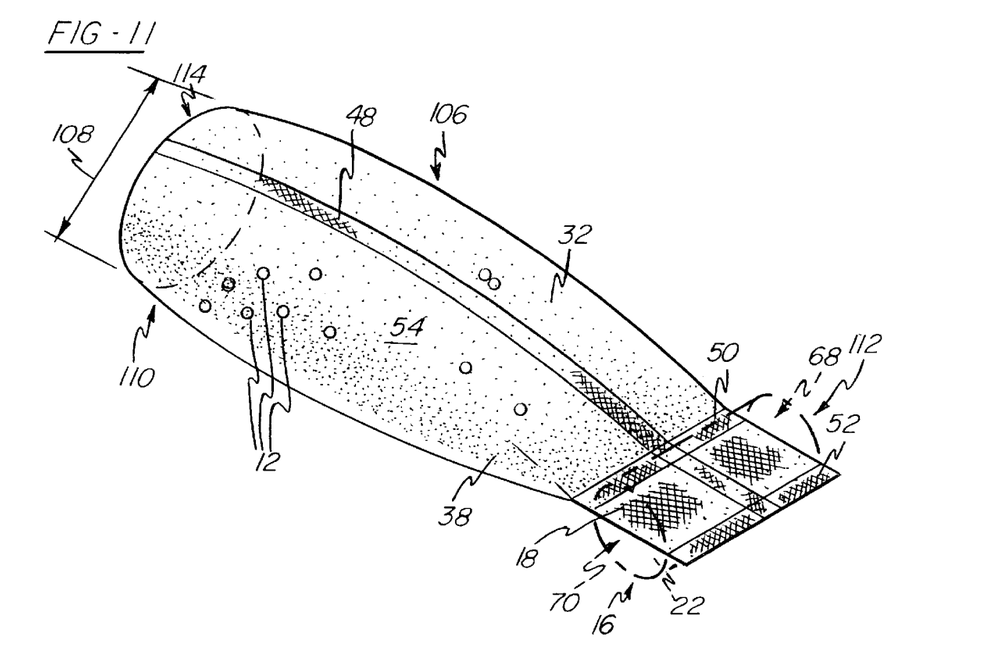
FIG. 11 is a bottom perspective view of FIG. 6 after spaced first and second seals are placed at one end of the tube-like structure and the longitudinal sides of the structure are cut between the seals.

Next, as shown in FIG. 11, a first seal 50 is placed across the width 108 of the tube-like structure 106 between the ends 110, 112 thereof substantially adjacent the opening 114 of the second end 112, and a second seal 52 seals across the width 108 of the tube-like structure 106 to seal the opening 114 of the second end 112. The seals 50, 52 connect the top layer 30 of the tube-like structure 106 with the bottom layer 32 and are placed using ultrasonic sealing, heat fusion and/or stitching procedures. Accordingly, the first seal 50 is placed such that the first end 110 defines a compartment 54 provided with an opening 114.

Figure 12:
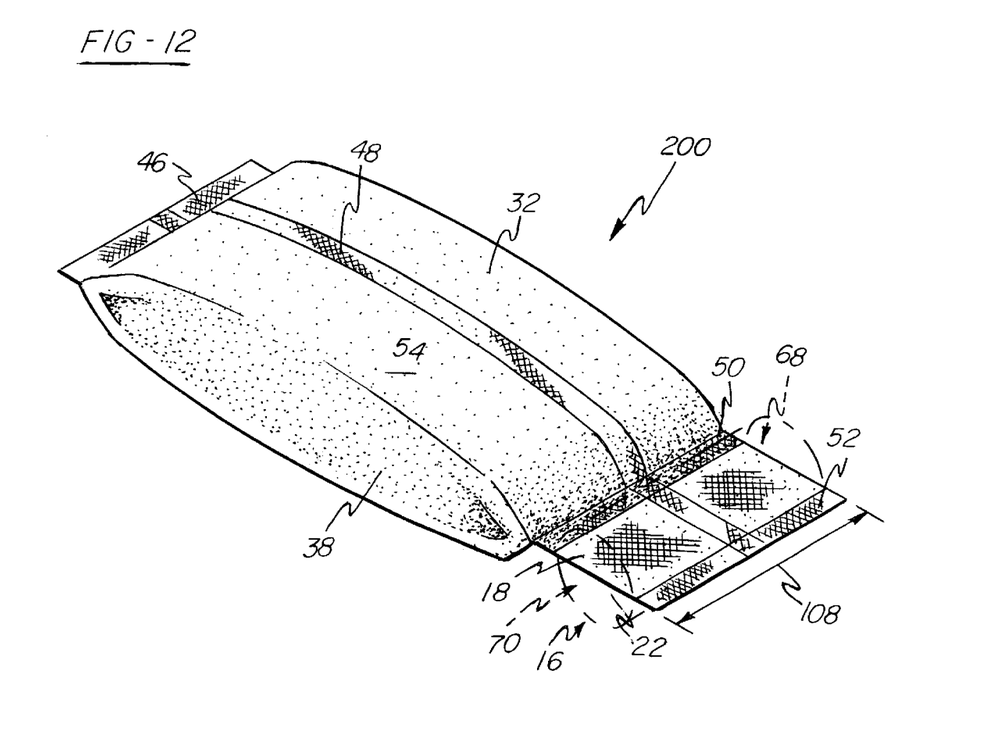
FIG. 12 is a bottom perspective view of the tube-like structure from FIG. 11 wherein the compartment has been sealed to form an end seal thereby forming a single desiccant bag of the present invention having a filter section integrated therein.

Next, as further shown in FIG. 11, the opposing sides 38, 40 of the tube-like structure 106 between the first and second seals 50, 52 are sliced lengthwise using a cutting tool or die (not shown) to form the filter section 16 disposed about a central axis 20 and having first and second openings 68, 70 to define a sleeve 22. Lastly, the compartment 54 is filled with desiccant 12 and the opening 114 of the first end 110 sealed shut, as shown in FIG. 12, so that the first end 110 has a sealed end 46 for containing particles 12 within the compartment 54. The sealed end 46 is formed via ultrasonic, heat fusion and/or stitching procedures.

Accordingly, the dual and single desiccant bags of the present invention effectively eliminates the need for a separate filter assembly and separate desiccant bag. As such, the bag of the present invention provides a simple way for combining the bag and filter while at the same time reducing the material and assembly costs associated with separate components. Also, the desiccant bag further keeps large particles from entering the orifice in the U-bend tube.

While the forms of apparatus herein described constitute preferred embodiments of the invention, it is to be understood that the invention is not limited to these precise forms of apparatus, and that changes may be made therein without departing from the scope of the invention.

What is claimed is:

1. A desiccant bag made of porous fabric comprising:
   a filter section comprising a wall portion disposed about a central axis to define a sleeve;
   first and second longitudinal end portions having opposing top and bottom layers comprising a length and a width and having opposing sides connecting said layers, said layers further having opposing first and second ends, said second ends of said layers of said first end portion and said second ends of said layers of said second end portion being connected to form sealed ends, said first ends opposingly and integrally joining said end portions with said outer wall so that said first ends run parallel with said central axis and said end portions extend outwardly therefrom;
   a seam extending longitudinally across said bag for sealing said bag lengthwise; and
   first and second seals, said first seal sealing together said first ends of said layers of said first end portion across said width thereof adjacent said wall portion and said second seal sealing together said first ends of said layers of said second end portion across said width thereof adjacent said wall portion so that said end portions define first and second compartments wherein said first seal and said sealed end of said first end portion define opposing ends of said first compartment and wherein said second seal and said sealed end of said second end portion define opposing ends of said second compartment, said first and second compartments having a plurality of desiccant particles contained therein.

2. The desiccant bag as recited in claim 1 wherein said wall portion further comprises first and second openings and has an aperture located intermediate said openings.

3. The desiccant bag as recited in claim 1 wherein said porous fabric comprises a non-woven fabric.

4. The desiccant bag as recited in claim 3 wherein said non-woven fabric comprises needle punched polyester felt.

5. The desiccant bag as recited in claim 3 wherein said non-woven fabric is selected from the group consisting essentially of spun bonded felt, spun bonded nylon, and spun bonded polyolefin.

6. A desiccant bag made from a porous fabric comprising:
   a filter section comprising a wall portion disposed about a central axis to define a sleeve;
   a longitudinal end portion having opposing top and bottom layers comprising a length and a width and having opposing sides connecting said layers, said layers further having opposing first and second ends, said second ends connected to form a sealed end, and said first ends integrally joining said end portion with said outer wall so that said first ends runs parallel with said central axis and said end portion extends outwardly therefrom;
   a seam extending longitudinally across said bag for sealing said bag lengthwise; and
   first and second seals, said second seal sealing along the length of the wall portion and said first seal sealing together said first ends of said layers across said width of said end portion adjacent said wall portion so that said end portion further defines a compartment wherein said first seal and said sealed end of said first end portion define opposing ends of said compartment, said compartment having a plurality of desiccant particles contained therein.

7. The desiccant bag as recited in claim 6 wherein said wall portion further includes first and second openings and an aperture located intermediate said openings.

8. The desiccant bag as recited in claim 6 wherein said porous fabric comprises a non-woven fabric.

9. The desiccant bag as recited in claim 8 wherein said non-woven fabric comprises needle punched polyester felt.

10. The desiccant bag as recited in claim 8 wherein said non-woven fabric comprises a member selected from the group consisting essentially of spun bonded felt, spun bonded nylon, and spun bonded polyolefin.

11. The desiccant bag as recited in claim 6 wherein said first seal and said second seal are in opposing relationship.

12. A method of making a desiccant bag comprising:
    (a) providing a sheet of porous fabric having opposing longitudinal and lateral side edges;
    (b) connecting said longitudinal side edges to form a tube-like structure comprising a width and having opposing top and bottom layers, opposing sides connecting said layers, and opposing first and second ends having openings;
    (c) placing spaced first and second seals intermediate said ends of said tube-like structure, said seals sealing across said width of said tube-like structure and connecting said top layer with said bottom layer so that said first and second ends define compartments provided with said openings;
    (d) cutting said opposing longitudinal sides of said tube-like structure between said first and second seals lengthwise to form a filter section having a wall portion disposed about a central axis and having first and second openings to define a sleeve;
    (e) placing desiccant particles in said compartments; and
    (f) sealing said openings of said first and second ends so that said ends have sealed ends for containing said particles within said compartments.

13. A method of making a desiccant bag as recited in claim 12 wherein connecting said longitudinal edges in step (b) forms a continuous seam extending longitudinally across said tube-like structure.

14. A method of making a desiccant bag as recited in claim 12 wherein said first and second seals in step (c) are placed via stitching.

15. A method of making a desiccant bag as recited in claim 12 wherein said first and second seals in step (c) are placed via heat fusion.

16. A method of making a desiccant bag as recited in claim 12 wherein said first and second seals in step (c) are placed via ultrasonic sealing.

17. A method of making a desiccant bag as recited in claim 12 wherein said openings are sealed in step (f) via stitching to form sealed ends.

18. A method of making a desiccant bag as recited in claim 12 wherein said openings are sealed in step (f) via heat fusion to form sealed ends.

19. A method of making a desiccant bag as recited in claim 12 wherein said openings are sealed in step (f) via ultrasonic sealing to form sealed ends.

20. A method of making a desiccant bag as recited in claim 12 further including providing an aperture in said filter section intermediate said first and second openings of said wall portion.

21. A method of making a desiccant bag as recited in claim 12 wherein said porous fabric comprises non-woven fabric.

22. A method of making a desiccant bag as recited in claim 21 wherein said non-woven fabric comprises needle punched polyester felt.

23. A method of making a desiccant bag as recited in claim 21 wherein said non-woven fabric is selected from the group consisting essentially of spun bonded felt, nylon, and polyolefin.

24. A method of making a single desiccant bag comprising:
 (a) providing a sheet of porous fabric having opposing longitudinal and lateral side edges;
 (b) connecting said longitudinal side edges to form a tube-like structure comprising a width and having opposing top and bottom layers, opposing sides connecting said layers, and opposing first and second ends having openings;
 (c) placing spaced first and second seals in said tube-like structure, said second seal sealing together said top and bottom layers across said width of said tube-like structure to seal said opening of said second end, said first seal sealing together said top and bottom layers across said width of said tube-like structure adjacent said second seal so that said first end defines a compartment provided with said opening of said first end;
 (d) cutting said opposing longitudinal sides of said tube-like structure between said first and second seals lengthwise to form a filter section having a wall portion disposed about a central axis and having first and second openings to define a sleeve;
 (e) placing desiccant particles in said compartment; and
 (f) sealing said opening of said first end so that said first end has a sealed end for containing said particles within said compartment.

25. A method of making a desiccant bag as recited in claim 24 wherein connecting said longitudinal edges in step (b) forms a continuous seam extending longitudinally across said tubular structure.

26. A method of making a desiccant bag as recited in claim 24 wherein said first and second seals in step (c) are placed via stitching.

27. A method of making a desiccant bag as recited in claim 24 wherein said first and second seals in step (c) are placed via heat fusion.

28. A method of making a desiccant bag as recited in claim 24 wherein said first and second seals in step (c) are placed via ultrasonic sealing.

29. A method of making a desiccant bag as recited in claim 24 wherein said openings are sealed in step (f) via stitching to form sealed ends.

30. A method of making a desiccant bag as recited in claim 24 wherein said openings are sealed in step (f) via heat fusion to form sealed ends.

31. A method of making a desiccant bag as recited in claim 24 wherein said openings are sealed in step (f) via ultrasonic sealing to form sealed ends.

32. A method of making a desiccant bag as recited in claim 24 further including providing an aperture in said filter section intermediate said first and second openings of said wall portion.

33. A method of making a desiccant bag as recited in claim 25 wherein said porous fabric comprises non-woven fabric.

34. A method of making a desiccant bag as recited in claim 33 wherein said non-woven fabric comprises needle punched polyester felt.

35. A method of making a desiccant bag as recited in claim 33 wherein said non-woven fabric is selected from the group consisting essentially of spun bonded felt, spun bonded nylon, and spun bonded polyolefin.

* * * * *